United States Patent
Gaidon et al.

(10) Patent No.: US 11,436,498 B2
(45) Date of Patent: Sep. 6, 2022

(54) NEURAL ARCHITECTURE SEARCH SYSTEM FOR GENERATING A NEURAL NETWORK ARCHITECTURE

(71) Applicant: Toyota Research Institute, Inc., Los Altos, CA (US)

(72) Inventors: Adrien David Gaidon, Mountain View, CA (US); Jie Li, Los Altos, CA (US); Vitor Guizilini, Santa Clara, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 269 days.

(21) Appl. No.: 16/896,774

(22) Filed: Jun. 9, 2020

(65) Prior Publication Data

US 2021/0383240 A1    Dec. 9, 2021

(51) Int. Cl.
  *G06N 3/08*    (2006.01)
  *G06T 7/55*    (2017.01)
  *H04N 13/204*    (2018.01)
  *H04N 13/00*    (2018.01)

(52) U.S. Cl.
  CPC .............. *G06N 3/088* (2013.01); *G06T 7/55* (2017.01); *H04N 13/204* (2018.05); *G06T 2207/20081* (2013.01); *G06T 2207/20084* (2013.01); *H04N 2013/0081* (2013.01)

(58) Field of Classification Search
  CPC . G06N 3/088; G06T 7/55; G06T 2207/20081; G06T 2207/20084; H04N 13/204; H04N 2013/0081
  USPC .......................................................... 706/25
  See application file for complete search history.

(56) References Cited

U.S. PATENT DOCUMENTS

| | | | |
|---|---|---|---|
| 2019/0251439 A1* | 8/2019 | Zoph | G06N 3/0445 |
| 2020/0090359 A1 | 3/2020 | Pillai et al. | |
| 2021/0241097 A1* | 8/2021 | Zhao | G06K 9/6232 |

OTHER PUBLICATIONS

Liu et al., "DARTS: Differentiable Architecture Search," 13 pages, arXiv:1806.09055v2 [cs.LG] Apr. 23, 2019.
Saeed et al., "Multi-task Self-Supervised Learning for Human Activity Detection," 31 pages, arXiv:1907.11879v1 [cs. LG] Jul. 27, 2019.
Shin et al., "Differentiable Neural Network Architecture Search," ICLR 2018 Workshop, 4 pages (2018).

(Continued)

*Primary Examiner* — Allen C Wong
(74) *Attorney, Agent, or Firm* — Christopher G. Darrow; Darrow Mustafa PC (57) ABSTRACT

A neural architecture search system for generating a neural network includes one or more processors and a memory. The memory includes a generator module, a self-supervised training module, and an output module. The modules cause the one or more processors to generate a candidate neural network by a controller neural network, obtain training data, generate an output by the candidate neural network performing a specific task using the training data as an input, determine a loss value using a loss function that considers the output of the candidate neural network and at least a portion of the training data, adjust the one or more model weights of the controller neural network based on the loss value, and output the candidate neural network. The candidate neural network may be derived from the controller neural network and one or more model weights of the controller neural network.

20 Claims, 5 Drawing Sheets

(56) References Cited

OTHER PUBLICATIONS

Zhong et al., "Practical Block-Wise Neural Network Architecture Generation," The IEEE Conference on Computer Vision and Pattern Recognition (CVPR), pp. 2423-2432 (2018).
Unknown, "Neural Architecture Search and Beyond for Representation Learning," https://sites.google.com/view/cvpr20-nas/ (Last accessed Jun. 9, 2020, 3 pages).

* cited by examiner

NEURAL ARCHITECTURE SEARCH SYSTEM FOR GENERATING A NEURAL NETWORK ARCHITECTURE

TECHNICAL FIELD

The subject matter described herein relates, in general, to systems and methods for generating a neural network architecture for performing a task using a neural architecture search system.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Neural networks are machine-learning models that are highly complex and may utilize one or more layers of nonlinear structures to determine an output based on and obtained input. The development of a neural network may be painstakingly slow and typically is performed by experts.

Neural architecture search (NAS) is a technique for automating the design of artificial neural networks, a widely used model in the field of machine learning. However, current NAS techniques either utilize a recurrent network to generate model descriptions of neural networks trained with reinforcement learning or utilize a supernetwork that contains multiple varieties of candidate networks trained with supervised training to maximize the expected accuracy of the generated architectures on a validation set. As such, this type of NAS involves supervised training that requires human-annotated training data sets, which are cumbersome to develop.

SUMMARY

This section generally summarizes the disclosure and is not a comprehensive explanation of its full scope or all its features.

In one embodiment, a neural architecture search system for generating a neural network architecture for performing a task includes one or more processors and a memory in communication with the one or more processors. The memory includes a generator module, a self-supervised training module, and an output module.

The generator module causes the one or more processors to generate a candidate neural network by a controller neural network. The candidate neural network has a network architecture and one or more reference weights according to the controller neural network and one or more model weights of the controller neural network.

The self-supervised training module causes the one or more processors to obtain training data, generate an output by the candidate neural network performing a specific task using the training data as an input, determine a loss value using a loss function that considers the output of the candidate neural network and at least a portion of the training data, and adjust the one or more model weights of the controller neural network based on the loss value. The output module causes the one or more processors to output the candidate neural network.

In another embodiment, a method for generating a neural network architecture for performing a task includes the steps of generating a candidate neural network by a controller neural network, obtaining training data, generating an output by the candidate neural network performing a specific task using the training data as an input, determining a loss value using a loss function that considers the output of the candidate neural network and at least a portion of the training data, adjusting the one or more model weights of the controller neural network based on the loss value, and outputting the candidate neural network. The candidate neural network may have a network architecture and one or more reference weights according to the controller neural network and one or more model weights of the controller neural network.

In yet another embodiment, a non-transitory computer-readable medium storing instructions for generating a neural network architecture for performing a task that, when executed by one or more processors, cause the one or more processors to generate a candidate neural network by a controller neural network, obtain training data, generate an output by the candidate neural network performing a specific task using the training data as an input, determine a loss value using a loss function that considers the output of the candidate neural network and at least a portion of the training data, adjust the one or more model weights of the controller neural network based on the loss value, and output the candidate neural network. The candidate neural network may have a network architecture and one or more reference weights according to the controller neural network and one or more model weights of the controller neural network.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a neural architecture search system, related method, and non-transitory medium. The neural architecture search system can develop a candidate neural network for performing a particular task by training a controller neural network with training data in a self-supervised fashion. Generally, the development of a neural network to perform a particular task is cumbersome, time-consuming, and requires the expertise of one or more experts. In addition, the training of neural networks may be performed in a supervised fashion, wherein training data must be annotated, which is also time-consuming and cumbersome. The neural architecture search system described in this specification has the advantages in that it can automatically generate a candidate neural network that is ready to be implemented.

The controller neural network has one or more model weights. Based on the adjustment of these one or more model weights of the controller neural network, the controller neural network will generate a candidate neural network having reference weights and a network architecture based on the controller neural network and its associated model weights. The controller neural network generates the candidate neural network and receives training data. The training data is inputted into the candidate neural network where an output is obtained. The output is compared, either directly or indirectly, to the training data to generate a loss value based on the loss function. This is commonly referred to as self-supervised training, wherein the training data itself provides the supervision. This is particularly advantageous in that the training data does not need to be annotated, which, as stated previously, can be time-consuming and cumbersome.

Based on the loss value, the model weights of the controller neural network are adjusted, and the controller neural network generates another candidate neural network. Once the training data is exhausted, the controller neural network will output the final version of the candidate neural network. The candidate neural network may be ready for implementation and may not need any additional training.

Figure 1:
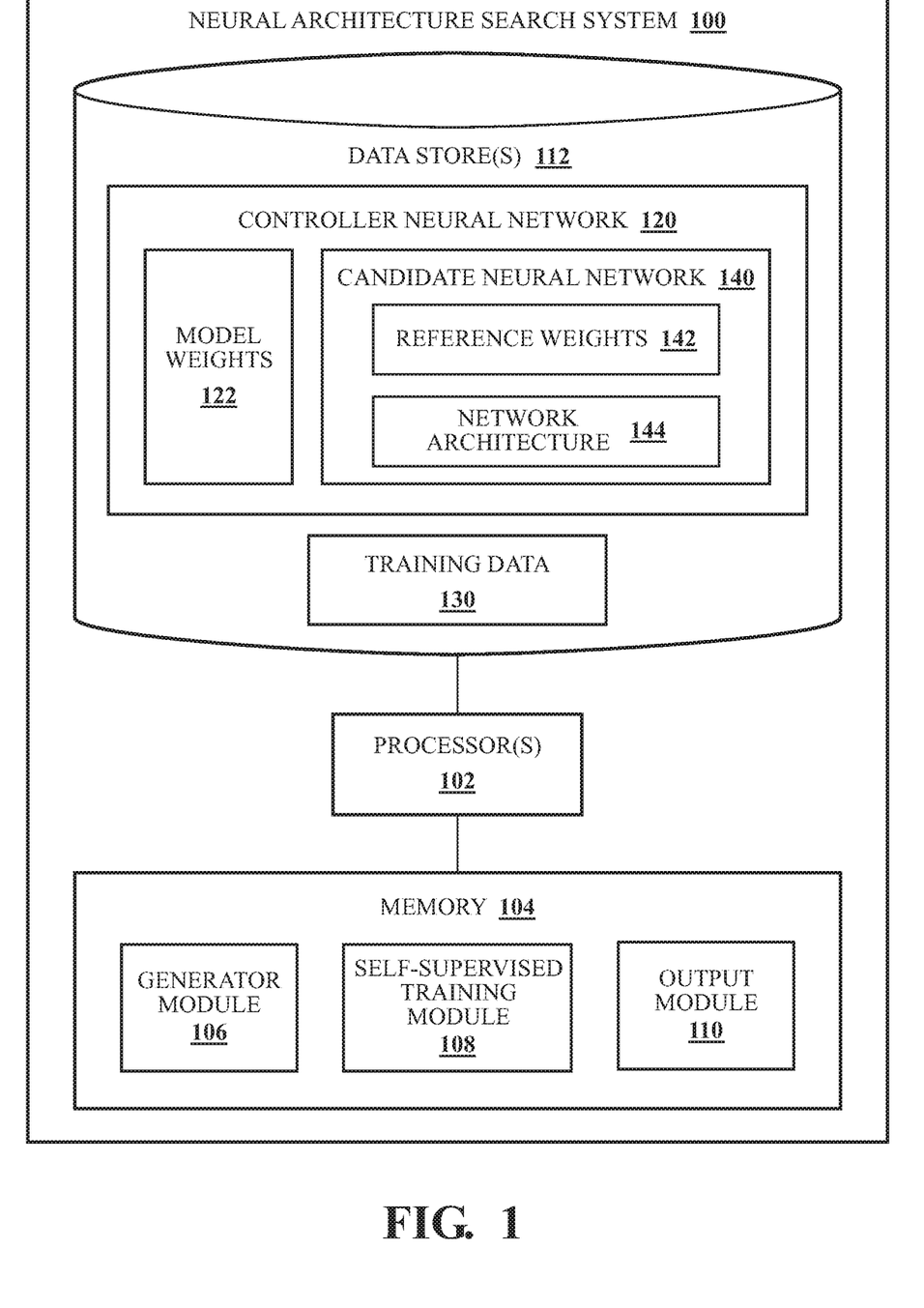
FIG. 1 illustrates one embodiment of a neural architecture search system.

Referring to FIG. 1, one example of a neural architecture search system 100 is shown. In this example, the neural architecture search system includes one or more processor(s) 102, a memory 104 that is in communication with the processor(s) 102, and one or more data store(s) 112 that is also in communication with the one or more processor(s) 102.

Accordingly, the processor(s) 102 may be a part of the neural architecture search system 100 or the neural architecture search system 100 may access the processor(s) 102 through a data bus or another communication path. In one or more embodiments, the processor(s) 102 may be an application-specific integrated circuit that is configured to implement functions associated with a generator module 106, a self-supervised training module 108, and/or an output module 110. In general, the processor(s) 102 are an electronic processor such as a microprocessor that is capable of performing various functions as described herein.

As stated before, the neural architecture search system 100 may include a memory 104 that stores the generator module 106, the self-supervised training module 108, and the output module 110. The memory 104 may be a random-access memory (RAM), read-only memory (ROM), a hard disk drive, a flash memory, or other suitable memory for storing the modules 106, 108, and/or 110. The modules 106, 108, and/or 110 are, for example, computer-readable instructions that, when executed by the processor(s) 102, cause the processor(s) 102 to perform the various functions disclosed herein.

With regards to the data store(s) 112, the data store(s) 112 are, in one embodiment, an electronic data structure such as a database that is stored in the memory 104 or another memory and that is configured with routines that can be executed by the processor(s) 102 for analyzing stored data, providing stored data, organizing stored data, and so on. Thus, in one embodiment, the data store(s) 112 stores data used by the modules 106, 108, and/or 110 in executing various functions. In one embodiment, the data store(s) 112 includes a controller neural network 120 that has one or more model weights 122. As will be explained later, the controller neural network using the model weights 122 generates the candidate neural network 140. The model weights 122 of the controller neural network 120 are modified during a self-supervised training process that utilizes the training data 130 to train the controller neural network 120, which will eventually output a candidate neural network 140 that may be fully trained and ready to be implemented. In one example, the specific tasks that the candidate neural network 140 performs are monocular depth estimation, wherein a depth system utilizing the candidate neural network 140 is able to receive monocular images and generate a depth map that may be an image or image channel that contains information relating to the distance of the surfaces of scene objects from a viewpoint.

Concerning the generator module 106, the generator module 106 includes instructions that, when executed by the processor(s) 102, causes the processor(s) 102 to generate the candidate neural network 140 by the controller neural network 120. The candidate neural network 140 may have a network architecture 144 and one or more reference weights 142 according to the controller neural network 120 and the one or more model weights 122 of the controller neural network 120.

Any one of a number of different methodologies for generating the candidate neural network 140 by the controller neural network 120 may be utilized. In one example, the controller neural network 120 may generate the candidate neural network 140 based on model weights 122 of the controller neural network 120. Moreover, the controller neural network 120 is a neural network that has parameters, which may be based on the model weights 122, which are configured to generate output sequences in accordance with the parameters. Each candidate neural network 140 generated by the controller neural network 120 defines a respective possible architecture.

In one example, each output sequence of the candidate neural networks 140 by the controller neural network 120 includes a respective output at each of multiple time steps, and each time step in the output sequence corresponds to a different hyperparameter of the architecture of the candidate neural network 140. Thus, each output sequence includes, at each time step, a respective value of the corresponding hyperparameter. Collectively, the values of the hyperparameters in a given output sequence define an architecture for the candidate neural network 140. Generally, a hyperparameter is a value that is set prior to the commencement of the training of the controller neural network 120, and that affects the operations performed by the candidate neural network 140. This procedure is described further in U.S. Pat. App. Pub. No. 2019/0251439 to Zoph et al., the contents of which are hereby incorporated by reference in its entirety.

Other methodologies may be utilized by the generator module 106 to generate the candidate neural network 140 by the controller neural network 120. For example, the generator module 106 may include instructions that cause the processor(s) 102 to generate the candidate neural network 140 by using a differentiable architecture search type methodology. This approach differs from the previously described approach in that instead of learning over a discrete and non-differentiable search space. this method is based on the continuous relaxation of the architecture representation, allowing the efficient search of the architecture.

With regards to the self-supervised training module 108, the self-supervised training module 108 includes instructions that cause the processor(s) 102 to obtain training data, generate an output by the candidate neural network performing a specific task using the training data as an input, determine a loss value using a loss function that considers the output of the candidate neural network and at least a portion of the training data, and adjust the one or more model weights of the controller neural network based on the loss value. In effect, this type of training is referred to as self-supervised training, wherein the training set provides the supervision. The training set does not need to be annotated, as is the case of supervised training, thus reducing the burden of generating the training set.

As will be described later in this specification, the training data 130 used to train the controller neural network 120 in a self-supervised fashion may be in the form of images. The images may be synchronized stereo image pairs. In this type of self-supervised training, synchronized stereo image pairs can be used to predict the pixel disparities between the pair. Using this disparity to generate a loss value by a loss function, the controller neural network 120 can be trained to generate a candidate neural network 140 that may be fully trained and ready to be implemented once training has been completed. As such, the loss function utilizes at least one constraint, which may be a geometric constraint. In this example, the geometric constraint may be a photometric consistency loss between a pair of images from stereo cameras.

However, other types of self-supervised training may also be utilized. For example, another methodology may include structure from motion (SfM). Depth estimation using SfM is based on the idea that one can perceive and structurally understand the 3D environment by moving around it. In this example, the training data may be a plurality of consecutive images at different time intervals of the scene and reasoning about the 3D structure from the change in view at each time step. The transformation from one view to another is obtained using depth and the change in relative position as it moves.

In deep learning approaches, neural networks are used to predict the depth and optionally pose. This, in turn, can be utilized to generate a synthetic image that can be compared to a depth map outputted by the candidate neural network 140. Based on this comparison, which may also include a comparison to one of the images from the training data 130, a loss function can calculate a loss value. The loss value will then be utilized to adjust the one or more weights of the controller neural network. Over time, the controller neural network 120 is trained and will eventually output a candidate neural network 140 that may be fully trained and ready to be implemented. In this example, the geometric constraint would include a depth and relative camera pose changes from a camera providing the training data at two (or more) different moments in time.

Again, it should be understood that any one of a number of different self-supervised training methodologies could be utilized. For example, U.S. Pat. App. Pub. No. 2020/0090359 to Pillai et al., which is hereby incorporated by reference in its entirety, describes another methodology that utilizes a self-supervised approach to depth estimation that includes using a differentiable flip-augmentation layer to improve the estimate.

Regardless of what self-supervised methodology is utilized for training the controller neural network 120, once the training of the controller neural network 120 is complete and the controller neural network 120 generates a final version of the candidate neural network 140, the output module 110 causes the processor(s) 102 to the output the final candidate neural network 140. The final candidate neural network 140 may be a fully trained neural network that is ready for deployment. However, in some examples, the final candidate neural network 140 may undergo further training and/or adjustment before deployment.

Figure 2:
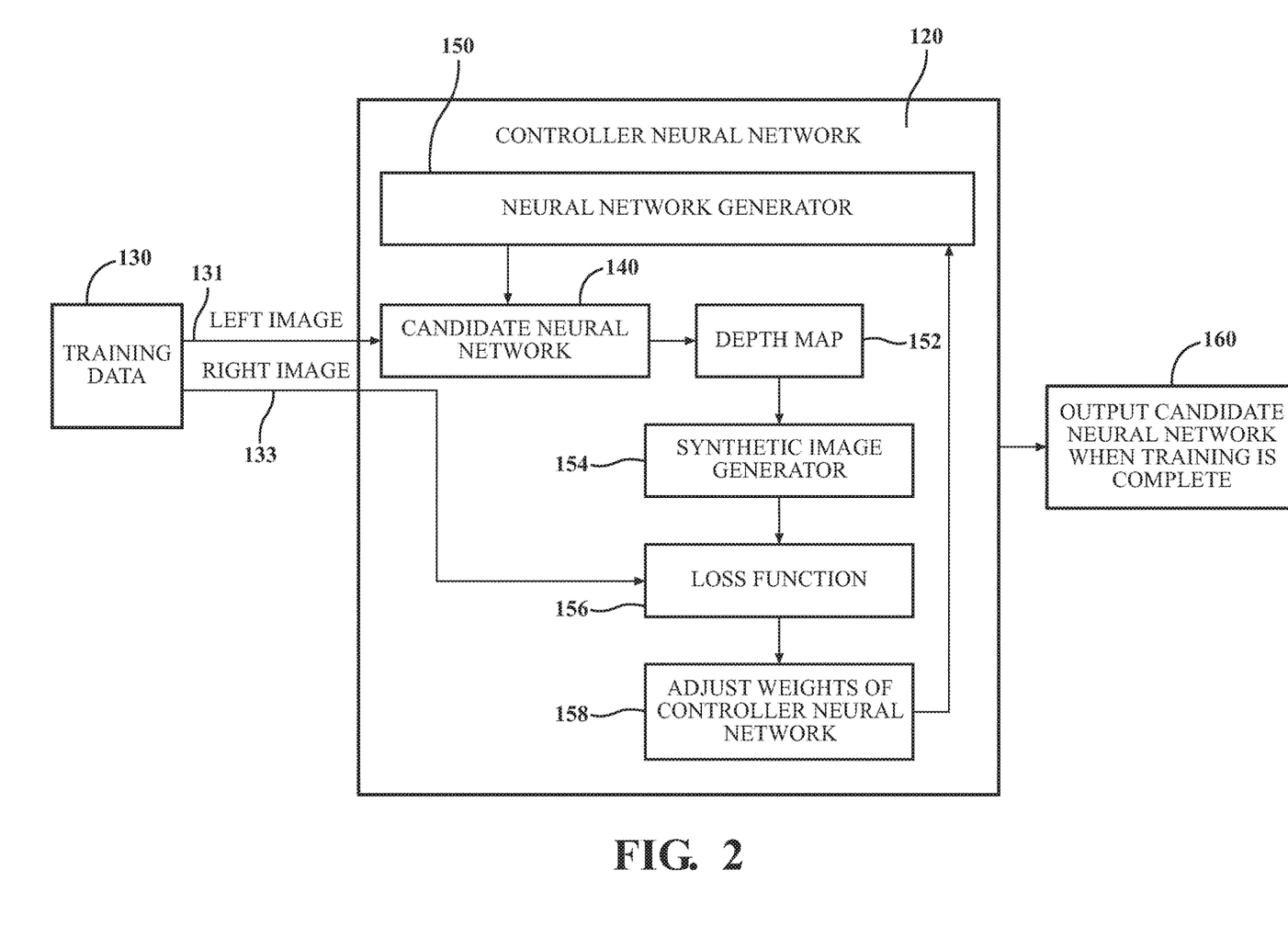
FIG. 2 illustrates a flow diagram for generating a candidate neural network by the neural architecture search system of FIG. 1 using stereoscopic images as training data.

In order to better understand the neural architecture search system 100 of FIG. 1, a flow diagram illustrating how the candidate neural network 140 is generated by the controller neural network 120 is shown in FIG. 2. In this example, the training data 130 are sets of paired stereo images 131 and 133. As stated previously, one form of self-supervised training involves the use of synchronized stereo image pairs that can be used to predict the pixel disparities between the pair. Using this disparity to generate a loss value by a loss function, the controller neural network 120 can be trained to generate a candidate neural network 140 that may be fully trained and ready to be implemented once training of the controller neural network 120 has been completed.

Here, the neural network generator 150 generates the candidate neural network 140, which may be generated using any of the methodologies previously described in this specification. The candidate neural network 140 receives the training data 130, which may be the left image 131 of a pair of stereo images 131 and 133. The candidate neural network 140 may have a network architecture 144 and one or more reference weights 142 based on the model weights of the controller neural network 120. The left image 131, in this example, is inputted into the candidate neural network 140, which outputs a depth map 152.

In order to perform self-supervised training, the depth map 152 is provided to a synthetic image generator 154, which attempts to generate the right image 133 from the depth map 152. The loss function 156 compares the right image 133 to the synthetic image generated by the synthetic image generator 154 to generate a loss value. Based on this loss value, at box 158, the weights are adjusted of the controller neural network 120. Thereafter, the neural network generator 150 generates another candidate neural network 140 based on the updated model weights of the controller neural network 120. This process continues until the training data 130 is exhausted or otherwise is considered to be adequate. Once the training data is exhausted or the training otherwise is ended, the controller neural network 120 outputs the final candidate neural network 160.

In the example shown in FIG. 2, the self-supervised training utilizes a pair of synchronized stereo images. However, as stated previously, other self-supervised training methodologies may also be incorporated. As such, referring to FIG. 3, another example of the controller neural network 220 is shown. In this example, like reference numerals, that have been incremented by 100, have been utilized referred to like elements. As such, additional description of these elements will not be provided with regards to this figure, as the previously provided descriptions are suitable.

Figure 3:
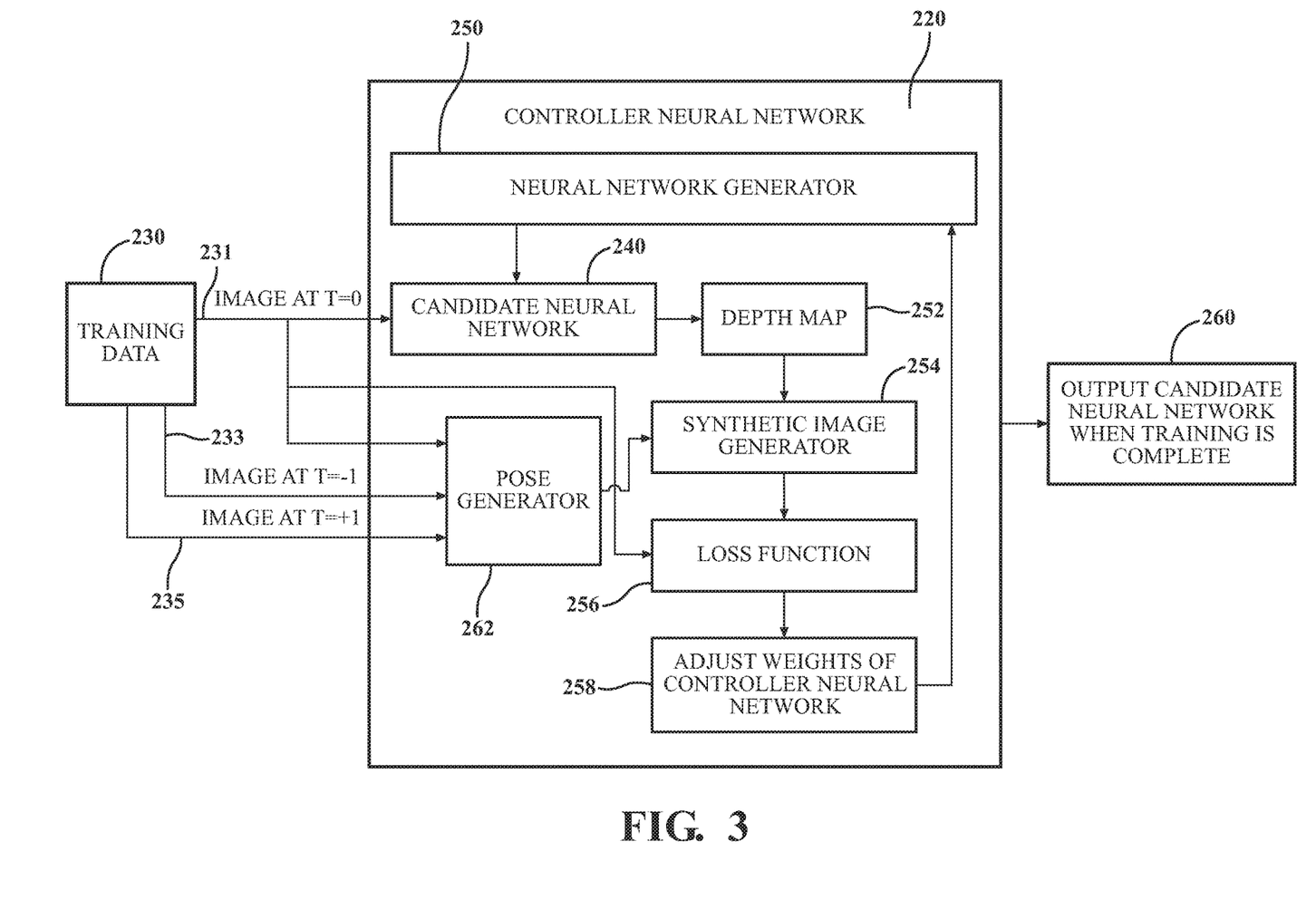
FIG. 3 illustrates a flow diagram for generating a candidate neural network by the neural architecture search system of FIG. 1 using depth and poses to train the controller neural network.

Here, like before, the neural network generator 250 generates the candidate neural network 240. The training data 230 is a series of images at different times. For example, the image 231 was taken at time zero, the image 233 was taken at time+1, while the image 235 was taken at time −1. In this example, the candidate neural network receives the image 231 and generates the depth map 252. The pose generator 262 receives the images 231, 233, and 235 are generates depth and/or poses. This information is then provided to synthetic image generator 254, which then attempts to generate synthetic images of 233 from images 231 and 235. The synthetic images will be compared to the original image 233 by a loss function 256. The loss function 256 outputs a loss value, which is used to adjust the weights of the controller neural network 220, as indicated in box 258.

This process of receiving images, generating a depth map 252, a loss value from the loss function 256 continues, and the weights of the controller neural network 220 are adjusted accordingly. Once the training is complete, the controller neural network 220 outputs the final candidate neural network 260 that may be fully trained and ready to be deployed. Of course, the final candidate neural network 260 may undergo further training and/or adjustments.

As stated in the background section, the development of a neural network to perform the specific task, such as depth estimation from a monocular image, is extremely cumbersome, time-consuming, and requires significant human expertise. The controller neural network 120 or 220, after being trained in a self-supervised fashion using the training data 130 or 230, respectively, will be able to output a candidate neural network 160 or 260 that can perform monocular depth estimation. This development of the candidate neural network 160 or 260 by the controller neural network 120 or one 220 can overcome some of the drawbacks with traditional neural network development, such as being extremely cumbersome, time-consuming, and requiring significant human expertise.

Figure 4:
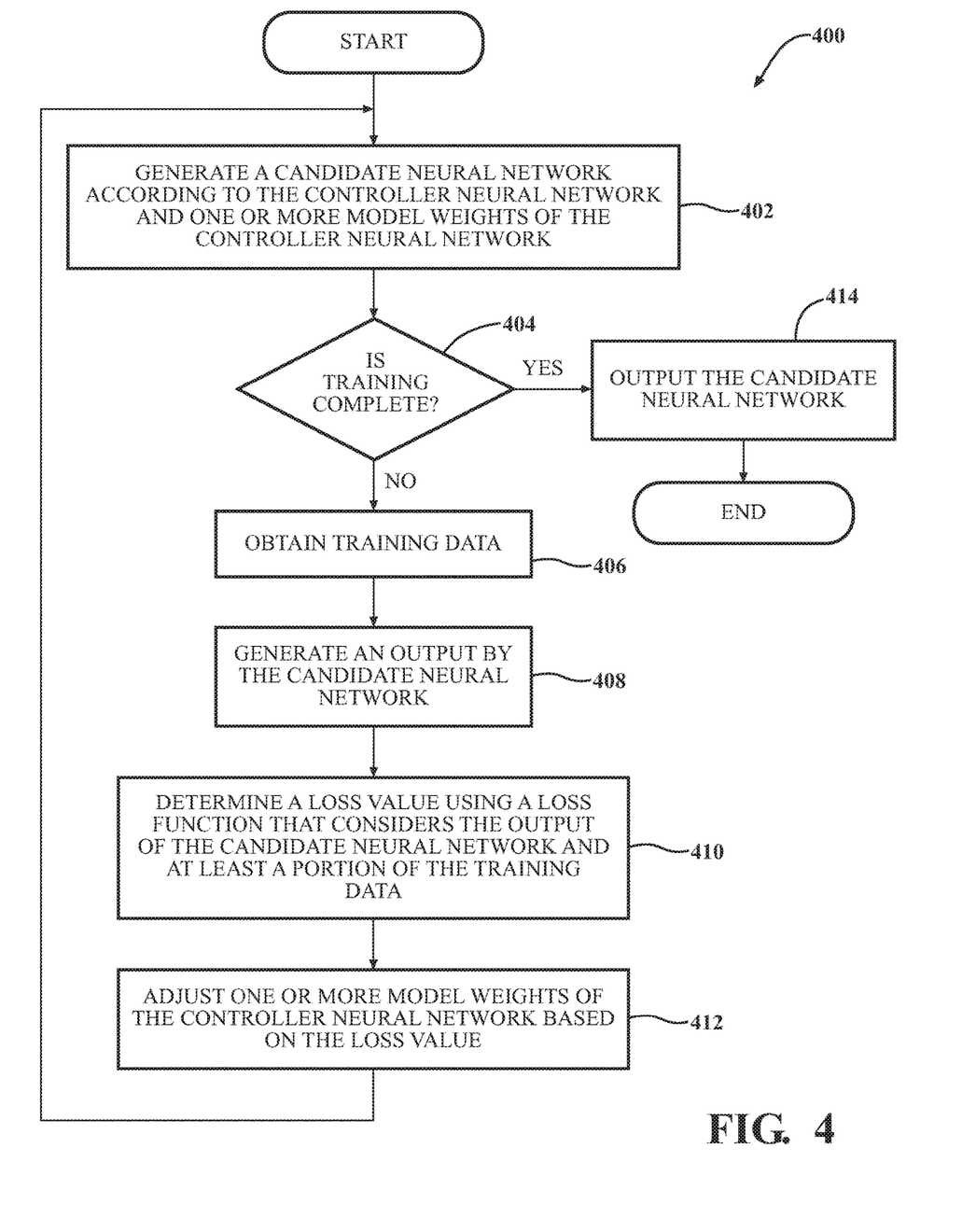
FIG. 4 illustrates a method for generating a candidate neural network by the neural architecture search system of FIG. 1.

Referring to FIG. 4, an example of a method 400 for generating a candidate neural network by a controller neural network is shown. The method 400 will be described from the viewpoint of the neural architecture search system 100 of FIG. 1. However, it should be understood that this is just one example of implementing the method 400. While method 400 is discussed in combination with the neural architecture search system 100, it should be appreciated that the method 400 is not limited to being implemented within neural architecture search system 100, but is instead one example of a system that may implement the method 400.

The method 400 begins at step 402, wherein the generator module 106 causes the processor(s) 102 to generate a candidate neural network according to the controller neural network 120 in one or more model weights 122 of the controller neural network 120. In one example, the controller neural network 120 is a neural network that has parameters, which may be based on the model weights 122, which are configured to generate output sequences in accordance with the parameters. Each candidate neural network 140 generated by the controller neural network 120 defines a respective possible architecture.

At step 404, the self-supervised training module 108 causes the processor(s) 102 to determine if the training of the controller neural network 120 is complete. A determination may be made that the training is complete once the training data 130 has been exhausted. Essentially, once the training data 130 has been considered during the self-supervised training of the controller neural network 120, a determination may be made that the training is complete. Alternatively, any one of a number of different methodologies for determining the training is complete could also be incorporated, such as ending training after certain amount of training data 130 has been considered or after some performance metrics have been accomplished.

If the training is not complete, the method 400 proceeds to step 406, wherein the self-supervised training module 108 causes the processor(s) 102 to obtain training data 130 from the data store(s) 112. In step 408, the self-supervised training module 108 causes the candidate neural network 140 to generate an output. The output may be in the form of a depth map that may be an image or image channel that contains information relating to the distance of the surfaces of scene objects from a viewpoint.

In step 410, the self-supervised training module 108 causes the processor(s) 102 to determine a loss value using a loss function. The loss function, broadly, considers the output of the candidate neural network and at least a portion of the training data. This type of training, because it does not rely on annotated data sets, is essentially self-supervised because the non-annotated training data 130 is the source of the supervision.

A number of different methodologies can be utilized to generate the loss value and an associated loss function. For example, the loss function may utilize at least one constraint, which could be a geometric constraint. In one example, the geometric constraint could include a photometric consistency loss between a pair of images from stereo cameras. In another example, the geometric constraint could include a depth in relative camera pose changes from a camera providing the training data at two (or more) different moments in time. No matter which methodology is utilized, a loss value is generated by an appropriate loss function.

In step 412, the self-supervised training module 108 causes the processor(s) 102 to adjust one or more model weights 122 of the controller neural network 120 based on the loss value. Essentially, by adjusting the model weights 122 of the controller neural network 120 based on the loss value, the controller neural network will be trained to generate a better and more accurate candidate neural network is able to perform a specific task, such as monocular depth estimation. Here, after completing step 412, the method 400 may return to step 402, begin again, and continue training until the training has been determined to be complete at step 404.

Once the training is complete, the output module 110 causes the processor(s) 102 to output the candidate neural network 140 as shown in step 414. The candidate neural network 140 may be fully trained and deployable. However, the candidate neural network 140, after being outputted, may undergo some additional training or adjustments.

The candidate neural network 140 may be implemented in any one of a number of different types of deployments. As stated before, the candidate neural network 140 may perform the specific task of monocular depth estimation. In this case, the candidate neural network 140 may be implemented in a system that requires information regarding the depth of objects captured from one or more monocular cameras. This type of system may be a fixed camera or could be a moving camera. Furthermore, the moving camera could be located within a vehicle.

Figure 5:
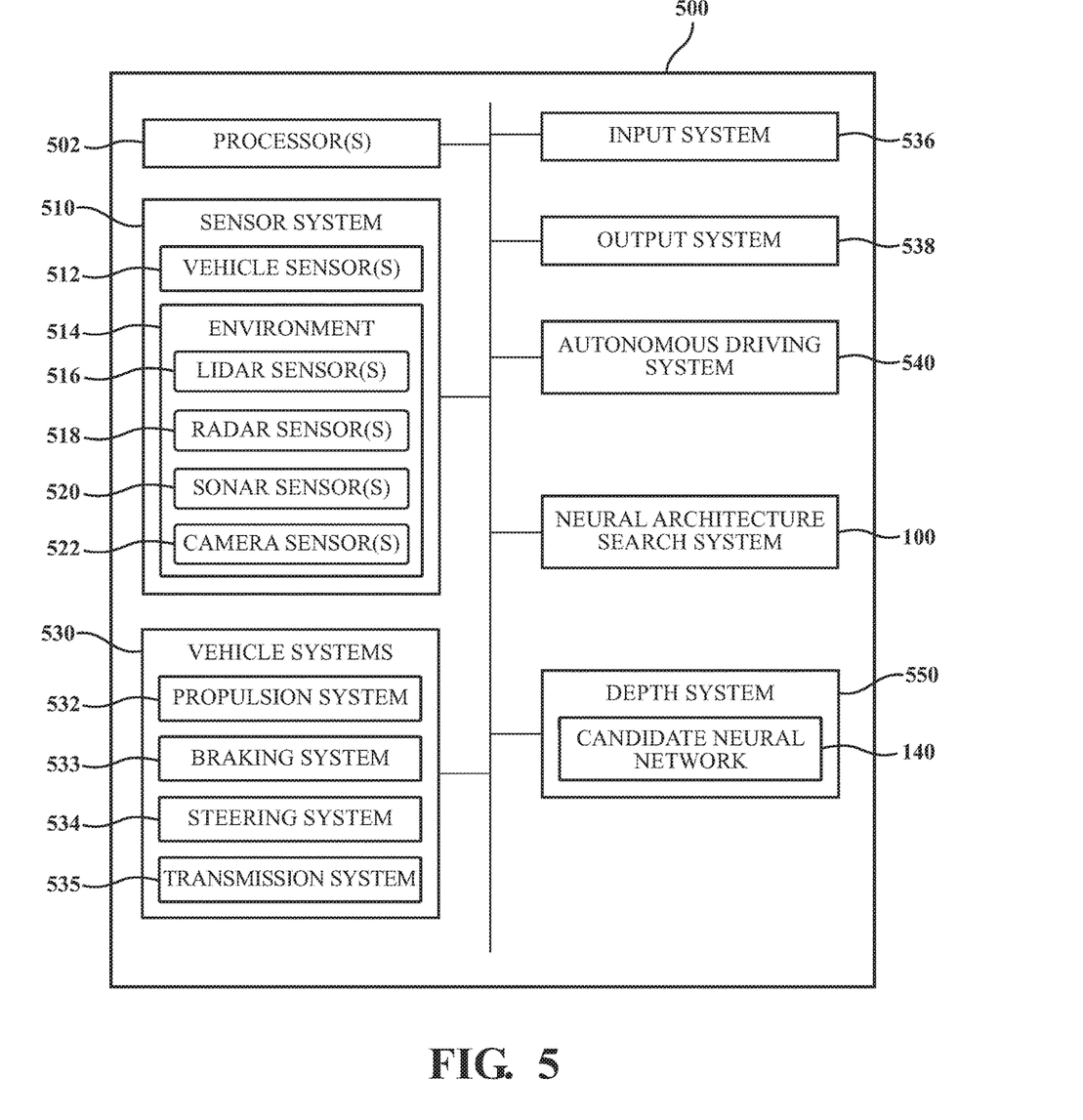
FIG. 5 illustrates one implementation of the neural architecture search system of FIG. 1 within a vehicle.

As such, referring to FIG. 5, a vehicle 500 incorporating the candidate neural network 140 is shown. As used herein, a "vehicle" is any form of powered transport. In one or more implementations, the vehicle 500 is an automobile. While arrangements will be described herein with respect to automobiles, it will be understood that embodiments are not limited to automobiles. In some implementations, the vehicle 500 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 540. Alternatively, the vehicle 500 may be a non-autonomous vehicle.

The vehicle 500 also includes various elements. It will be understood that in various embodiments it may not be necessary for the vehicle 500 to have all of the elements shown in FIG. 5. The vehicle 500 can have any combination of the various elements shown in FIG. 5. Further, the vehicle 500 can have additional elements to those shown in FIG. 5. In some arrangements, the vehicle 500 may be implemented without one or more of the elements shown in FIG. 5. While the various elements are shown as being located within the vehicle 500 in FIG. 5, it will be understood that one or more of these elements can be located external to the vehicle 500. Further, the elements shown may be physically separated by large distances and provided as remote services (e.g., cloud-computing services).

The vehicle 500 can include one or more processor(s) 502. In one or more arrangements, the processor(s) 502 can be a main processor of the vehicle 500. For instance, the processor(s) 502 can be an electronic control unit (ECU.)

As noted above, the vehicle 500 can include the sensor system 510. The sensor system 510 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 510 includes a plurality of sensors, the sensors can work independently from each other. Alternatively, two or more of the sensors can work in combination with each other. In such a case, the two or more sensors can form a sensor network. The sensor system 510 and/or the one or more sensors can be operatively connected to the processor(s) 502 and/or another element of the vehicle 500 The sensor system 510 can acquire data of at least a portion of the external environment of the vehicle 500 (e.g., nearby vehicles).

The sensor system 510 can include any suitable type of sensor. Various examples of different types of sensors will be described herein. However, it will be understood that the embodiments are not limited to the particular sensors described. The sensor system 510 can include one or more vehicle sensor(s) 512. The vehicle sensor(s) 512 can detect, determine, and/or sense information about the vehicle 500 itself. In one or more arrangements, the vehicle sensor(s) 512 can be configured to detect, and/or sense position and orientation changes of the vehicle 500, such as, for example, based on inertial acceleration. In one or more arrangements, the vehicle sensor(s) 512 can include one or more accelerometers, one or more gyroscopes, an inertial measurement unit (IMU), a dead-reckoning system, a global navigation satellite system (GNSS), a global positioning system (GPS), a navigation system, and/or other suitable sensors.

The sensor system 510 can include one or more environment sensors 514 configured to acquire, and/or sense driving environment data. "Driving environment data" includes data or information about the external environment in which an autonomous vehicle is located or one or more portions thereof. For example, the one or more environment sensors 514 can be configured to detect, quantify, and/or sense obstacles in at least a portion of the external environment of the vehicle 500 and/or information/data about such obstacles. Such obstacles may be stationary objects and/or dynamic objects. The one or more environment sensors 514 can be configured to detect, measure, quantify and/or sense other things in the external environment of the vehicle 500, such as, for example, lane markers, signs, traffic lights, traffic signs, lane lines, crosswalks, curbs proximate the vehicle 500, off-road objects, etc.

As an example, in one or more arrangements, the sensor system 510 can include one or more radar sensors 518, one or more LIDAR sensors 516, one or more sonar sensors 520, and/or one or more cameras 522. In one or more arrangements, the one or more cameras 126 can be high dynamic range (HDR) cameras or infrared (IR) cameras. In this case, the one or more cameras 522 may be one or more monocular cameras configured to capture images of the environment surrounding the vehicle 500.

The vehicle 500 can include an input system 536. An "input system" includes any device, component, system, element, or arrangement or groups thereof that enable information/data to be entered into a machine. The input system 536 can receive an input from a vehicle passenger (e.g., a driver or a passenger). The vehicle 500 can include an output system 538. An "output system" includes any device, component, or arrangement or groups thereof that enable information/data to be presented to a vehicle passenger (e.g., a person, a vehicle passenger, etc.).

The vehicle 500 can include one or more vehicle systems 530. Various examples of the one or more vehicle systems 530 are shown in FIG. 1. However, the vehicle 500 can include more, fewer, or different vehicle systems. It should be appreciated that although particular vehicle systems are separately defined, each or any of the systems or portions thereof may be otherwise combined or segregated via hardware and/or software within the vehicle 500. The vehicle 500 can include a propulsion system 532, a braking system 533, a steering system 534, and a transmission system 535. Each of these systems can include one or more devices, components, and/or a combination thereof, now known or later developed.

The vehicle 500 can include one or more modules, at least some of which are described herein. The modules can be implemented as computer-readable program code that, when executed by the processor(s) 502, implement one or more of the various processes described herein. One or more of the modules can be a component of the processor(s) 502, or one or more of the modules can be executed on and/or distributed among other processing systems to which the processor(s) 502 is operatively connected. The modules can include instructions (e.g., program logic) executable by one or more processor(s) 502.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include an autonomous driving system 540. The autonomous driving system 540 can be configured to receive data from the sensor system 510 and/or any other type of system capable of capturing information relating to the vehicle 500 and/or the external environment of the vehicle 500. In one or more arrangements, the autonomous driving system 540 can use such data to generate one or more driving scene models. The autonomous driving system 540 can determine the position and velocity of the vehicle 500. The autonomous driving system 540 can determine the location of obstacles, obstacles, or other environmental features, including traffic signs, trees, shrubs, neighboring vehicles, pedestrians, etc.

The autonomous driving system 540 can be configured to receive, and/or determine location information for obstacles within the external environment of the vehicle 500 for use by the processor(s) 502, and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

With that in mind, the vehicle 500 may include a depth system 550 that may be located separate from the autonomous driving system 540 or may be incorporated within the autonomous driving system 540. Here, the depth system 550 incorporates the candidate neural network 140 previously discussed in generated by the neural architecture search system 100 of FIG. 1. The candidate neural network 140 is configured to receive monocular images from, for example, the camera sensors 522, and output a depth map indicating the distance of one or more objects external from the vehicle 500 from a reference point. As such, the autonomous driving system 540 may utilize the depth map generated by the depth system 550 to pilot the vehicle 500.

The candidate neural network 140 may be incorporated within the depth system 550 by itself, without the neural architecture search system 100. However, as an alternative, the neural architecture search system 100 could be incorporated within the vehicle 500 to be trained by training data and generate or update the candidate neural network 140 of depth system 550. Again, it should be understood that the neural architecture search system 100 could be separate from the vehicle 500.

The autonomous driving system 540 either independently or in combination with the depth system 550 can be configured to determine travel path(s), current autonomous driving maneuvers for the vehicle 500, future autonomous driving maneuvers and/or modifications to current autonomous driving maneuvers based on data acquired by the sensor system 510, driving scene models, and/or data from any other suitable source. "Driving maneuver," means one or more actions that affect the movement of a vehicle. Examples of driving maneuvers include accelerating, decelerating, braking, turning, moving in a lateral direction of the vehicle 500, changing travel lanes, merging into a travel lane, and/or reversing, just to name a few possibilities. The autonomous driving system 540 can be configured to implement determined driving maneuvers. The autonomous driving system 540 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 540 can be configured to execute various vehicle functions and/or to transmit data to, receive data from, interact with, and/or control the vehicle 500 or one or more systems thereof.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein, and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the preceding specification, as indicating the scope hereof.

What is claimed is:

1. A neural architecture search system for generating a neural network architecture for performing a task, the system comprising:
   one or more processors; and
   a memory in communication with the one or more processors, the memory including:
      a generator module having instructions that, when executed by the one or more processors, causes the one or more processors to generate a candidate neural network by a controller neural network, the candidate neural network having a network architecture and one or more reference weights according to the controller neural network and one or more model weights of the controller neural network,
      a self-supervised training module, the self-supervised training module having instructions that, when executed by the one or more processors, causes the one or more processors to obtain training data, generate an output by the candidate neural network performing a specific task using the training data as an input, determine a loss value using a loss function that considers the output of the candidate neural network and at least a portion of the training data, and adjust the one or more model weights of the controller neural network based on the loss value, and
      an output module having instructions that, when executed by the one or more processors, causes the one or more processors to output the candidate neural network.

2. The neural architecture search system of claim 1, wherein the loss function utilizes at least one constraint.

3. The neural architecture search system of claim 2, wherein the at least one constraint is a geometric constraint.

4. The neural architecture search system of claim 3, wherein the geometric constraint includes a photometric consistency loss between a pair of images from stereo cameras.

5. The neural architecture search system of claim 3, wherein the geometric constraint includes a depth and relative camera pose changes from a camera providing the training data at two different moments in time.

6. The neural architecture search system of claim 1, wherein the specific task is monocular depth estimation.

7. The neural architecture search system of claim 1, wherein:
   the self-supervised training module further comprises instructions that, when executed by the one or more processors, causes the one or more processors to determine when the training data has been exhausted; and
   the output module further comprises instructions that, when executed by the one or more processors, causes the one or more processors to output the candidate neural network when the training data has been exhausted.

8. A method for generating a neural network architecture for performing a task, the method comprising:
   generating a candidate neural network by a controller neural network, the candidate neural network having a network architecture and one or more reference weights according to the controller neural network and one or more model weights of the controller neural network;
   obtaining training data;
   generating an output by the candidate neural network performing a specific task using the training data as an input;
   determining a loss value using a loss function that considers the output of the candidate neural network and at least a portion of the training data;
   adjusting the one or more model weights of the controller neural network based on the loss value; and
   outputting the candidate neural network.

9. The method of claim 8, wherein the loss function utilizes at least one constraint.

10. The method of claim 9, wherein the at least one constraint is a geometric constraint.

11. The method of claim 10, wherein the geometric constraint includes a photometric consistency loss between a pair of images from stereo cameras.

12. The method of claim 10, wherein the geometric constraint includes a depth and relative camera pose changes from a camera providing the training data at two different moments in time.

13. The method of claim 8, wherein the specific task is monocular depth estimation.

14. The method of claim 8, further comprising the steps of:
- determining when the training data has been exhausted; and
- outputting the candidate neural network when the training data has been exhausted.

15. A non-transitory computer-readable medium storing instructions for generating a neural network architecture for performing a task that, when executed by one or more processors, cause the one or more processors to:
- generate a candidate neural network by a controller neural network, the candidate neural network having a network architecture and one or more reference weights according to the controller neural network and one or more model weights of the controller neural network;
- obtain training data;
- generate an output by the candidate neural network performing a specific task using the training data as an input;
- determine a loss value using a loss function that considers the output of the candidate neural network and at least a portion of the training data;
- adjust the one or more model weights of the controller neural network based on the loss value; and
- output the candidate neural network.

16. The non-transitory computer-readable medium of claim 15, wherein the loss function utilizes at least one constraint.

17. The non-transitory computer-readable medium of claim 16, wherein the at least one constraint is a geometric constraint.

18. The non-transitory computer-readable medium of claim 17, wherein the geometric constraint includes a photometric consistency loss between a pair of images from stereo cameras.

19. The non-transitory computer-readable medium of claim 17, wherein the geometric constraint includes a depth and relative camera pose changes from a camera providing the training data at two different moments in time.

20. The non-transitory computer-readable medium of claim 15, wherein the specific task is monocular depth estimation.

* * * * *